United States Patent
Fukunaga

(10) Patent No.: US 7,962,680 B2
(45) Date of Patent: Jun. 14, 2011

(54) IMAGE FORMING APPARATUS AND CONNECTION NOTIFYING METHOD

(75) Inventor: Shinichi Fukunaga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 548 days.

(21) Appl. No.: 11/950,533

(22) Filed: Dec. 5, 2007

(65) Prior Publication Data

US 2008/0133808 A1    Jun. 5, 2008

(30) Foreign Application Priority Data

Dec. 5, 2006   (JP) ................................ 2006-328532
Nov. 7, 2007   (JP) ................................ 2007-289271

(51) Int. Cl.
  *G06F 1/00*   (2006.01)
  *G06F 1/26*   (2006.01)
  *G06F 13/00*  (2006.01)
  *H05K 7/10*   (2006.01)

(52) U.S. Cl. ........ 710/300; 710/100; 710/105; 710/301; 710/302; 710/305; 713/300; 713/310; 713/320; 713/321; 713/322; 713/323; 713/324; 713/330; 713/340

(58) Field of Classification Search .................. 710/301, 710/302, 100, 105, 305; 713/300, 310, 320–324, 713/330, 340
  See application file for complete search history.

(56) References Cited

U.S. PATENT DOCUMENTS

| | | | |
|---|---|---|---|
| 6,763,473 B1 * | 7/2004 | Oteki et al. | 713/324 |
| 7,070,100 B2 * | 7/2006 | Davie et al. | 235/440 |
| 7,176,785 B2 * | 2/2007 | Edogawa et al. | 340/286.02 |
| 7,177,972 B2 * | 2/2007 | Watanabe | 710/313 |
| 7,254,731 B2 * | 8/2007 | Satoh | 713/323 |
| 7,272,737 B2 * | 9/2007 | Oteki et al. | 713/324 |
| 7,539,886 B2 * | 5/2009 | Suga et al. | 713/324 |
| 7,561,285 B2 * | 7/2009 | Fujinaga et al. | 358/1.14 |
| 7,565,561 B2 * | 7/2009 | Yanagawa | 713/323 |
| 7,620,829 B2 * | 11/2009 | One | 713/320 |
| 7,653,772 B2 * | 1/2010 | Hayashi et al. | 710/306 |
| 7,673,165 B2 * | 3/2010 | Oteki et al. | 713/324 |
| 7,698,574 B2 * | 4/2010 | Morimoto et al. | 713/300 |
| 2004/0255175 A1 * | 12/2004 | Oteki et al. | 713/300 |
| 2006/0150236 A1 * | 7/2006 | Sakuda et al. | 725/135 |
| 2007/0049058 A1 * | 3/2007 | Kobayashi | 439/13 |
| 2007/0124617 A1 * | 5/2007 | Takamoto | 713/310 |
| 2007/0260783 A1 * | 11/2007 | Combs et al. | 710/62 |
| 2008/0010477 A1 * | 1/2008 | Nakamura | 713/323 |
| 2008/0133808 A1 * | 6/2008 | Fukunaga | 710/106 |
| 2009/0199022 A1 * | 8/2009 | Fukuda | 713/300 |
| 2009/0210734 A1 * | 8/2009 | Schramm et al. | 713/324 |

FOREIGN PATENT DOCUMENTS

JP        2004-96496        3/2004

OTHER PUBLICATIONS

"Differential Signals" by Douglas Brooks, Dated May 2001—2 pages.*

* cited by examiner

*Primary Examiner* — Brian T Misiura

(74) *Attorney, Agent, or Firm* — Oblon, Spivak, McClelland, Maier & Neustadt, L.L.P.

(57) ABSTRACT

An image forming apparatus includes an operating unit, a controller, and a transmission line that connects the operating unit to the controller. The operating unit includes a USB device that transmits data to the controller and receives data from the controller via the transmission line, and the controller includes a USB host that transmits data to the operating unit and receives data from the operating unit via the transmission line.

13 Claims, 11 Drawing Sheets

H: POWER IS GOOD
L: POWER IS NOT GOOD

IMAGE FORMING APPARATUS AND CONNECTION NOTIFYING METHOD

CROSS-REFERENCE TO RELATED APPLICATIONS

The present application claims priority to and incorporates by reference the entire contents of Japanese priority document 2006-328532 filed in Japan on Dec. 5, 2006 and 2007-289271 filed in Japan on Nov. 7, 2007.

BACKGROUND OF THE INVENTION

1. Field of the Invention

The present invention relates data transmission between an operating unit and a controller of an image forming apparatus.

2. Description of the Related Art

In a conventional image forming apparatus, data is bidirectionally transferred between an operating unit and a controller with a synchronous serial communication method. To realize the bidirectional data transfer, the operating unit and the controller are connected to each other with four signal lines including two data lines and two clock lines. Furthermore, Japanese Patent Application Laid-open No. 2004-96496 teaches to use a peripheral component interconnect (PCI) bus for performing data transfer between an engine and a controller.

However, the image forming apparatus employing the synchronous serial communication method has problems in a transfer rate and a susceptibility to a noise when the transfer rate is about 1 Mbps. Particularly, with the developments of various functions with image data, such as functions for displaying a preview image and a thumbnail image, there has been a tremendous increase in the amount of data that needs to be transferred between the operating unit and the controller. Therefore, there is a need to increase the data transfer speed between the operating unit and the controller of the image forming apparatus.

SUMMARY OF THE INVENTION

It is an object of the present invention to at least partially solve the problems in the conventional technology.

According to an aspect of the present invention, there is provided an image forming apparatus that includes an operating unit that receives an operation input from a user; a controller that includes a first control unit for controlling the image forming apparatus; and a transmission line that connects the operating unit to the controller as a channel for a data transfer between the operating unit and the controller with a differential data transfer method. The operating unit includes a first data-transfer unit that transmits data to the controller and receives data from the controller via the transmission line, and the controller includes a second data-transfer unit that transmits data to the operating unit and receives data from the operating unit via the transmission line.

According to another aspect of the present invention, there is provided a connection notifying method performed by an image forming apparatus that includes an operating unit that receives an operation input from a user, a controller that includes a first control unit for controlling the image forming apparatus, a transmission line that connects the operating unit to the controller as a channel for a data transfer between the operating unit and the controller with a differential data transfer method, a first data-transfer unit included in the operating unit and configured to transmit data to the controller and receive data from the controller via the transmission line, and a second data-transfer unit included in the controller and configured to transmit data to the operating unit and receive data from the operating unit via the transmission line. The method includes transmitting a signal indicating that a power supply voltage is within a predetermined voltage range from the second data-transfer unit to the first data-transfer unit when the second data-transfer unit is turned ON; and transmitting a connection notification from the first data-transfer unit to the second data-transfer unit when the first data-transfer unit receives the signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
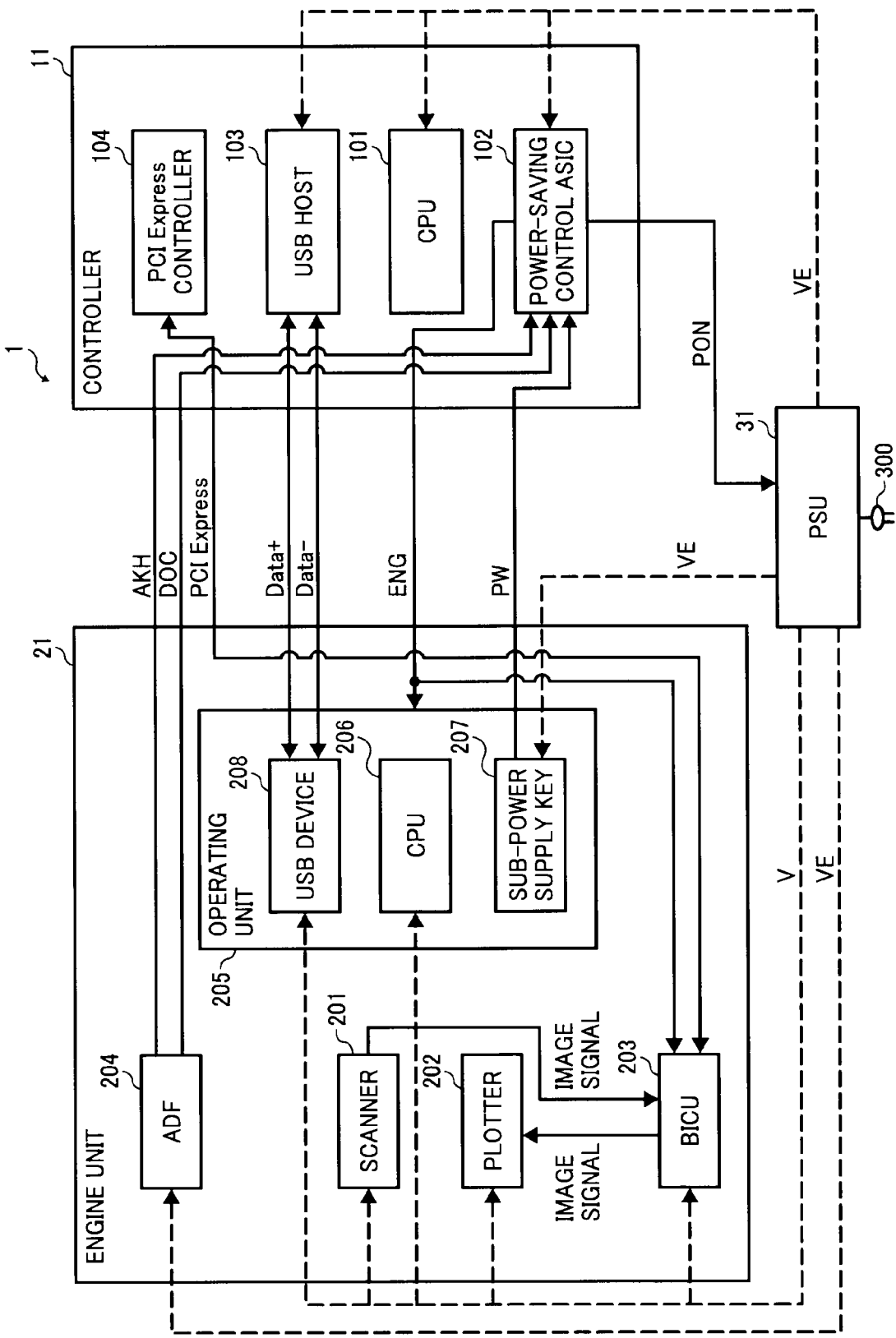
FIG. 1 is a block diagram of an image forming apparatus according to a first embodiment of the present invention.

FIG. 1 is a block diagram of an image forming apparatus 1 according to a first embodiment of the present invention. The image forming apparatus 1 includes a controller 11, an engine unit 21, and a power supply unit (PSU) 31. The PSU 31 supplies an electric power from an alternating current (AC) power source 300 to the controller 11 and the engine unit 21. The controller 11 and the engine unit 21 are connected to each other by a transmission line such as a universal serial bus (USB) and a peripheral component interconnect (PCI) Express bus. Although a PCI Express bus is used in the embodiments described below to connect between the controller 11 and the engine unit 21, any other connecting medium such as a PCI bus can be used.

The controller 11 controls the engine unit 21. For this purpose, the controller 11 includes a central processing unit (CPU) 101, a power-saving control application specific integrated circuit (ASIC) 102, a USB host 103, and a PCI Express controller 104.

The engine unit 21 performs operations such as scanning and image formation. For this purpose, the engine unit 21 includes a scanner 201, a plotter 202, a base engine and image processing control unit (BICU) 203, an auto document feeder (ADF) 204, and an operating unit 205. The operating unit 205 includes a CPU 206, a sub-power supply key 207, and a USB device 208.

The CPU 101 controls the entire controller 11. The power-saving control ASIC 102 controls an operation mode of the image forming apparatus 1. The PCI Express controller 104 controls a data transfer via the PCI Express bus. Incidentally, when the controller 11 and the engine unit 21 are connected to each other by the PCI bus, a PCI controller for controlling a data transfer via the PCI bus is provided instead of the PCI Express controller 104.

The USB host 103 and the operating unit 205 communicate with each other via the USB. The USB includes two signal lines, i.e., a Data+ line and a Data− line, for a differential data transfer.

The image forming apparatus 1 can operate at two operation modes: a normal mode and a power-saving mode. In the normal mode, the image forming apparatus 1 is ready to perform a process. In the power-saving mode, on the other hand, the image forming apparatus 1 is not ready to perform a process. Specifically, in the power-saving mode, the electric power is supplied to only to some units of the image forming apparatus 1. For example, the electric power is supplied to the sub-power supply key 207 only, and no electric power is supplied to the scanner 201, the plotter 202, and the like. Therefore, if a print instruction is input to the image forming apparatus 1 in the power-saving mode, the operation mode is changed to the normal mode, and the image forming apparatus 1 starts performing a printing process.

In the power-saving mode, the PSU 31 supplies the electric power only to the units pointed by dashed-line arrows VE shown in FIG. 1, i.e., to the sub-power supply key 207, the CPU 101, the power-saving control ASIC 102, the USB host 103, and the ADF 204, and does not supply any electric power to the other units. On the other hand, in the normal mode, the PSU 31 supplies the electric power to the units pointed by both dashed-line arrows V and the dashed-line arrows VE shown in FIG. 1, i.e., to all the units included in the controller 11 and the engine unit 21. Incidentally, it is preferable that a 12-volt electric power is supplied to engine systems such as the scanner 201 and the plotter 202, and a 5-volt electric power is supplied to the other units.

The power-saving control ASIC 102 receives an AKH signal and a DOC signal from the ADF 204. The AKH signal is a signal indicating whether a pressure plate of the ADF 204 is in an open state or a closed state. The DOC signal is a signal indicating that a document is set up on the ADF 204. In addition, the power-saving control ASIC 102 receives a PW signal from the sub-power supply key 207. The PW signal is a signal indicating that the sub-power supply key 207 is pressed by a user.

The power-saving control ASIC 102 controls the PSU 31 based on the AKH signal, the DOC signal, or the PW signal. Specifically, if the power-saving control ASIC 102 receives the AKH signal while the image forming apparatus 1 is in the power-saving mode, the power-saving control ASIC 102 transmits a PON signal to the PSU 31 to change the operation mode to the normal mode. The PON signal is a signal indicating an instruction to supply the electric power to the units pointed by the dashed-line arrows V and VE. Upon receiving the PON signal, the PSU 31 starts supplying the electric power to the units pointed by the dashed-line arrows V in addition to the units pointed by the dashed-line arrows VE, i.e., the units pointed by the dashed-line arrows V are turned ON. As a result, the operation mode is changed to the normal mode. If the power-saving control ASIC 102 receives the DOC signal or the PW signal while the image forming apparatus 1 is in the power-saving mode, in the same manner as the case of the AKH signal, the power-saving control ASIC 102 transmits the PON signal to the PSU 31 to change the operation mode to the normal mode.

Moreover, upon receiving the AKH signal, the DOC signal, or the PW signal, the power-saving control ASIC 102 transmits an ENG signal to the engine unit 21. The ENG signal is a signal for notifying of a change to the normal mode. The ENG signal is divided into two ENG signals in the engine unit 21, and the ENG signals are respectively output to the operating unit 205 and the BICU 203.

Upon receiving the ENG signal, the operating unit 205 starts performing a process for changing the operation mode to the normal mode once the CPU 206 is activated. In other words, irrespective of whether a USB communication between the USB host 103 and the USB device 208 is established, the operating unit 205 starts performing the process for changing the operation mode to the normal mode.

When the operating unit 205 does not receive the ENG signal, the operating unit 205 performs a process corresponding to a command received via the USB after the USB communication is established. Incidentally, in the conventional technology, which did not have the ENG signal, in the same manner as above, a process corresponding to a command received via the USB is performed after the USB communication is established.

Because the AKH signal, the DOC signal, and the PW signal are generated due to a user's operation, it can be said that the user is present around the image forming apparatus 1 with the intension to use the image forming apparatus 1. Upon receiving any of the AKH signal, the DOC signal, and the PW signal, the power-saving control ASIC 102 transmits the ENG signal to the operating unit 205, so that the operating unit 205 can perform the process for changing the operation mode to the normal mode quickly, i.e., the operating unit 205 lights up quickly. Therefore, it is convenient for the user when operating the image forming apparatus via the operating unit 205.

On the other hand, upon receiving the ENG signal, the BICU 203 starts performing a process for changing the operation mode to the normal mode (a process for starting up the scanner 201 or the plotter 202) once a CPU (not shown) included in the BICU 203 is activated. In other words, irrespective of whether a PCI Express communication between the PCI Express controller 104 and the BICU 203 is established, the BICU 203 starts performing the process for changing the operation mode to the normal mode.

In absence of the ENG signal, the BICU 203 performs a process corresponding to a command received via the PCI Express bus after the PCI Express communication is established. Incidentally, in the conventional technology, which did not have the ENG signal, in the same manner as above, a process corresponding to a command received via the PCI Express bus is performed after the PCI Express communication is established.

Incidentally, it takes relatively longer time for changing from the power-saving mode to the normal mode with a switch.

The scanner 201 scans a document thereby obtaining image data, and outputs an image signal indicative of the image data to the BICU 203. The plotter 202 plots an image on a recording medium, such as a paper, based on the image signal received from the BICU 203. The BICU 203 controls the entire engine unit 21. The ADF 204 detects whether the pressure plate is opened or closed. The CPU 206 controls the entire operating unit 205. The sub-power supply key 207 receives an input from the user by being pressed down by the user. The USB device 208 communicates with the controller 11 via the USB. For example, specifically, the USB device 208 transmits the image data scanned by the scanner 201 to the USB host 103, or receives image data from the USB host 103 via the USB. Upon receiving the image data from the USB host 103, the USB device 208 outputs the received image data to the plotter 202 to print out the image.

In this manner, because the USB device 208 and the USB host 103 are connected to each other by differential transmission lines, it is possible to realize a high-speed and stable communication between the controller 11 and the engine unit 21. Namely, in the image forming apparatus 1 it is possible to speed up a data transfer rate, a processing time for changing the operation mode from the power-saving mode to the normal mode, and a start-up time, and thus the entire image forming apparatus 1 can perform the processing at high speed. Moreover, by the use of the USB as one of the differential transmission lines, the number of required cables as the signal line is reduced, i.e., fewer and thinner cables are sufficient, so that the cables can be easily laid inside the image forming apparatus. Even if a multi-channel USB is used instead of a single-channel USB, because thinner cables can be used, the cables can be easily laid inside the image forming apparatus.

The USB host 103 has a function to continuously monitor and manage the USB device 208, so that a CPU (not shown) of the USB host 103 needs a higher processing capacity than that of the USB device 208. Therefore, by arranging the USB host 103 in the controller 11, the engine unit 21 can reduce data throughput.

If the USB host 103 has excess USB ports, it is possible to increase a memory capacity of the controller 11 by connecting a USB memory to one of those USB ports. On the other hand, if the USB device 208 has excess USB ports, it is possible to enhance the scalability of the engine unit 21 by connecting peripheral devices, for example, a reader/writer such as a USB memory, a secure digital (SD) card, a memory stick, and a Compact Flash (CF) card to those USB ports. If the number of the peripheral devices is larger than the number of the USB ports, a USB hub can be connected to any of the USB ports, and the excess peripheral devices can be connected to the USB hub.

The image forming apparatus 1 according to the first embodiment is explained above. The image forming apparatus 1 can be altered or modified in various ways.

For example, a serial advanced technology attachment (SATA) bus or an Institute of Electrical and Electronics Engineers (IEEE) 1394 bus can be used instead of the USB.

Figure 2:
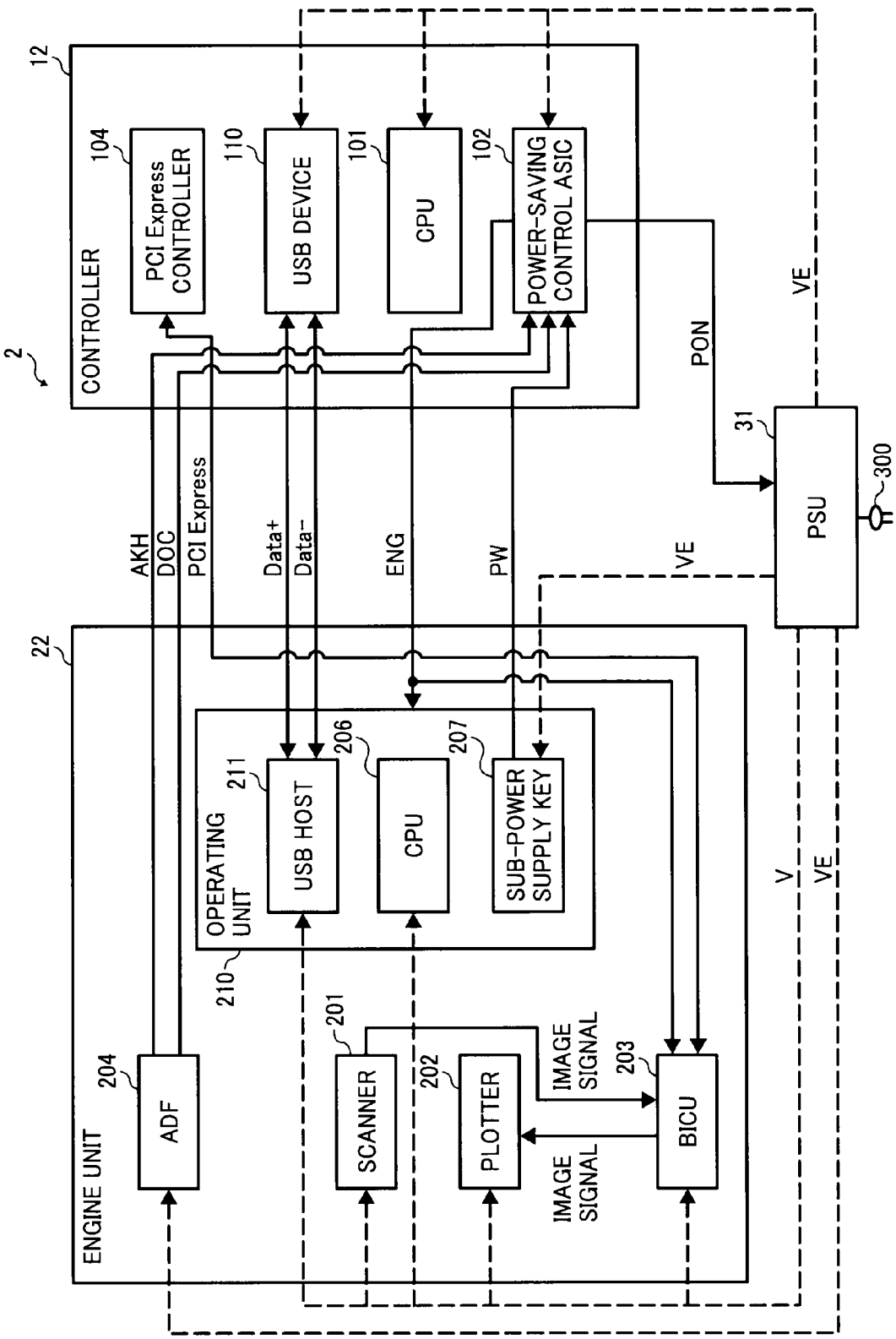
FIG. 2 is a block diagram of an image forming apparatus according to a second embodiment of the present invention.

FIG. 2 is a block diagram of an image forming apparatus 2 according to a second embodiment of the present invention. The portions identical to those in FIG. 1 are denoted with the same reference numerals, and the description of those portions is omitted. A difference between the image forming apparatuses 1 and 2 is that, in the image forming apparatus 2, a controller 12 includes a USB device 110 instead of the USB host 103, and an operating unit 210 in an engine unit 22 includes a USB host 211 instead of the USB device 208.

The USB host 211 has a function to continuously monitor and manage the USB device 110, so that a CPU (not shown) of the USB host 211 needs a higher processing capacity than that of the USB device 110. Therefore, by arranging the USB host 211 in the engine unit 22, the controller 12 can reduce data throughput.

If the USB host 211 has excess USB ports, it is possible to increase a memory capacity of the engine unit 22 by connecting a USB memory to one of those USB ports. In addition or alternatively, it is possible to enhance the scalability of the engine unit 22 by connecting peripheral devices, for example, a reader/writer such as an SD card, a memory stick, and a CF card can be connected to those USB ports. If the number of the peripheral devices is larger than the number of the USB ports, a USB hub can be connected to any of the USB ports, and the excess peripheral devices can be connected to the USB hub.

Figure 3:
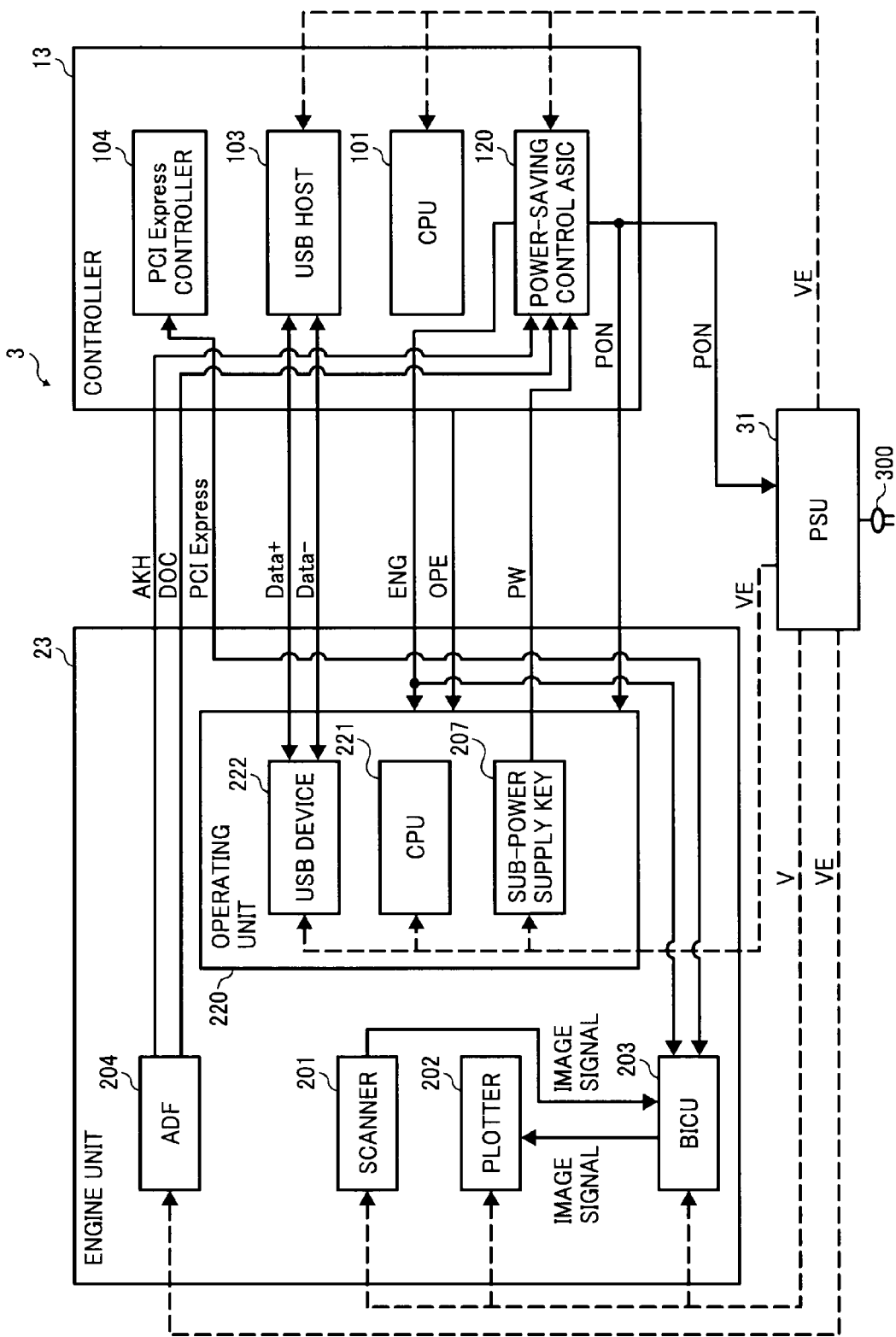
FIG. 3 is a block diagram of an image forming apparatus according to a third embodiment of the present invention.

FIG. 3 is a block diagram of an image forming apparatus 3 according to a third embodiment of the present invention. The portions identical to those in FIG. 1 are denoted with the same reference numerals, and the description of those portions is omitted. A difference between the image forming apparatuses 1 and 3 is that, in the image forming apparatus 3, a controller 13 includes a power-saving control ASIC 120 instead of the power-saving control ASIC 102, and an operating unit 220 in an engine unit 23 includes a USB device 222 instead of the USB device 208 and a CPU 221 instead of the CPU 206. When the image forming apparatus 3 is in the power-saving mode, the PSU 31 supplies the electric power to the USB device 222 and the CPU 221 in addition to the CPU 101, the power-saving control ASIC 120, the USB host 103, the ADF 204, and the sub-power supply key 207 as pointed by dashed-line arrows VE. As another embodiment, a random access memory (RAM) (not shown) having a self-refresh function is arranged in the operating unit 220. With the self-refresh function of the RAM, even in the power-saving mode, the operating unit 220 can receive an operation input from the user via a screen thereon whereby it is possible to reduce the power consumption.

The power-saving control ASIC 120 transmits the PON signal not only to the PSU 31 but also to the operating unit 220. Therefore, even though the electric power is supplied to all the units in the operating unit 220 in the power-saving mode, the CPU 221 can determine a timing to change the operation mode from the power-saving mode to the normal mode based on the PON signal. The controller 13 transmits an OPE signal, which is a signal indicating an instruction for a hardware reset, to the operating unit 220 at a predetermined timing. For example, upon receiving an instruction for a reset via a network, the controller 13 transmits the OPE signal to the operating unit 220. When the engine unit 23 receives the OPE signal, the engine unit 23 performs a hardware reset of the entire engine unit 23.

In this manner, even when the image forming apparatus 3 in the power-saving mode, the electric power is supplied to all the units in the operating unit 220, so that the image forming apparatus 3 can be improved so that the user can easily change the operation mode from the power-saving mode to the normal mode.

Figure 4:
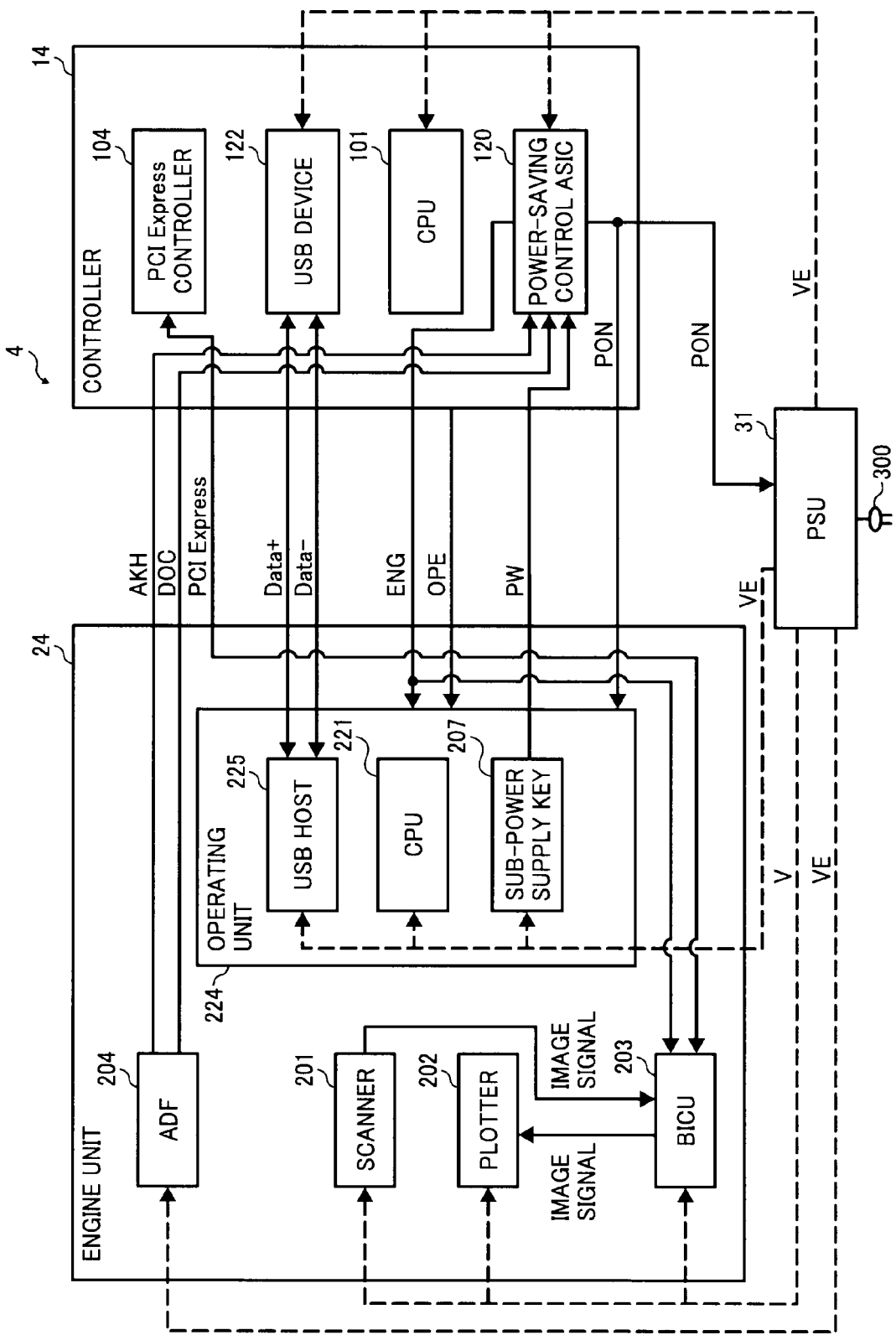
FIG. 4 is a block diagram of an image forming apparatus according to a fourth embodiment of the present invention.

FIG. 4 is a block diagram of an image forming apparatus 4 according to a fourth embodiment of the present invention. The portions identical to those in FIG. 3 are denoted with the same reference numerals, and the description of those portions is omitted. A difference between the image forming apparatuses 3 and 4 is that, in the image forming apparatus 4, a controller 14 includes a USB device 122 instead of the USB host 103, and an operating unit 224 in an engine unit 24 includes a USB host 225 instead of the USB device 222.

Figure 5:
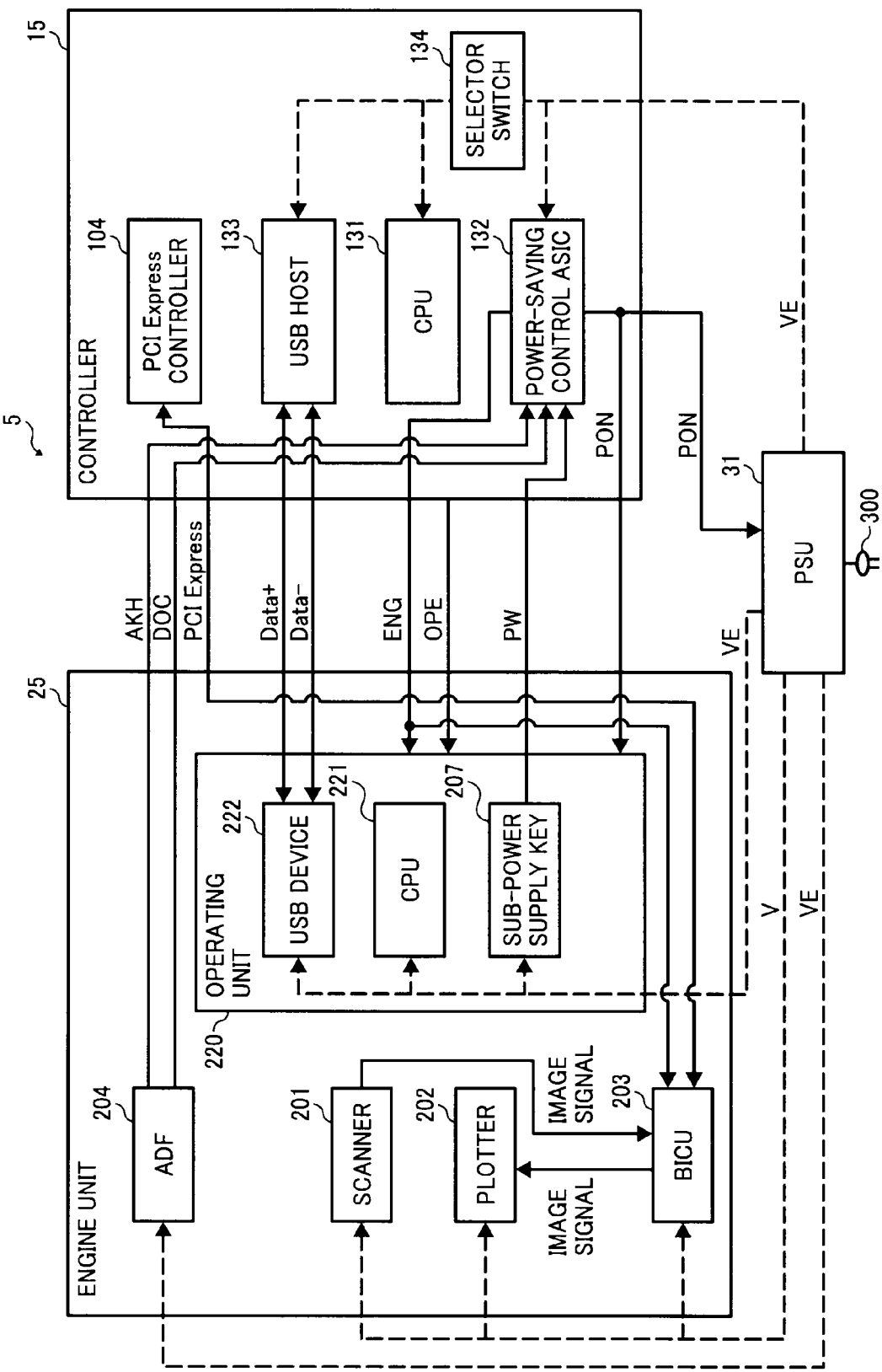
FIG. 5 is a block diagram of an image forming apparatus according to a fifth embodiment of the present invention.

FIG. 5 is a block diagram of an image forming apparatus 5 according to a fifth embodiment of the present invention. The portions identical to those in FIG. 3 are denoted with the same reference numerals, and the description of those portions is omitted. A difference between the image forming apparatuses 3 and 5 is that, in the image forming apparatus 5, a controller 15 includes a USB host 133 instead of the USB host 103, a CPU 131 instead of the CPU 101, a power-saving control ASIC 132 instead of the power-saving control ASIC 120, and further includes a selector switch 134. The selector switch 134 controls whether the electric power from the PSU 31 is supplied to the CPU 131 and the USB host 133. Specifically, when the image forming apparatus 5 is in the power-saving mode, no electric power is supplied to the CPU 131 and the USB host 133. On the other hand, when the image forming apparatus 5 is in the normal mode, the electric power is supplied to the power-saving control ASIC 132, the CPU 131, and the USB host 133.

In this manner, when the image forming apparatus 5 is in the power-saving mode, the electric power is supplied to the power-saving control ASIC 132 and not supplied to other units in the controller 15. Therefore, it is possible to reduce power consumption.

Figure 6:
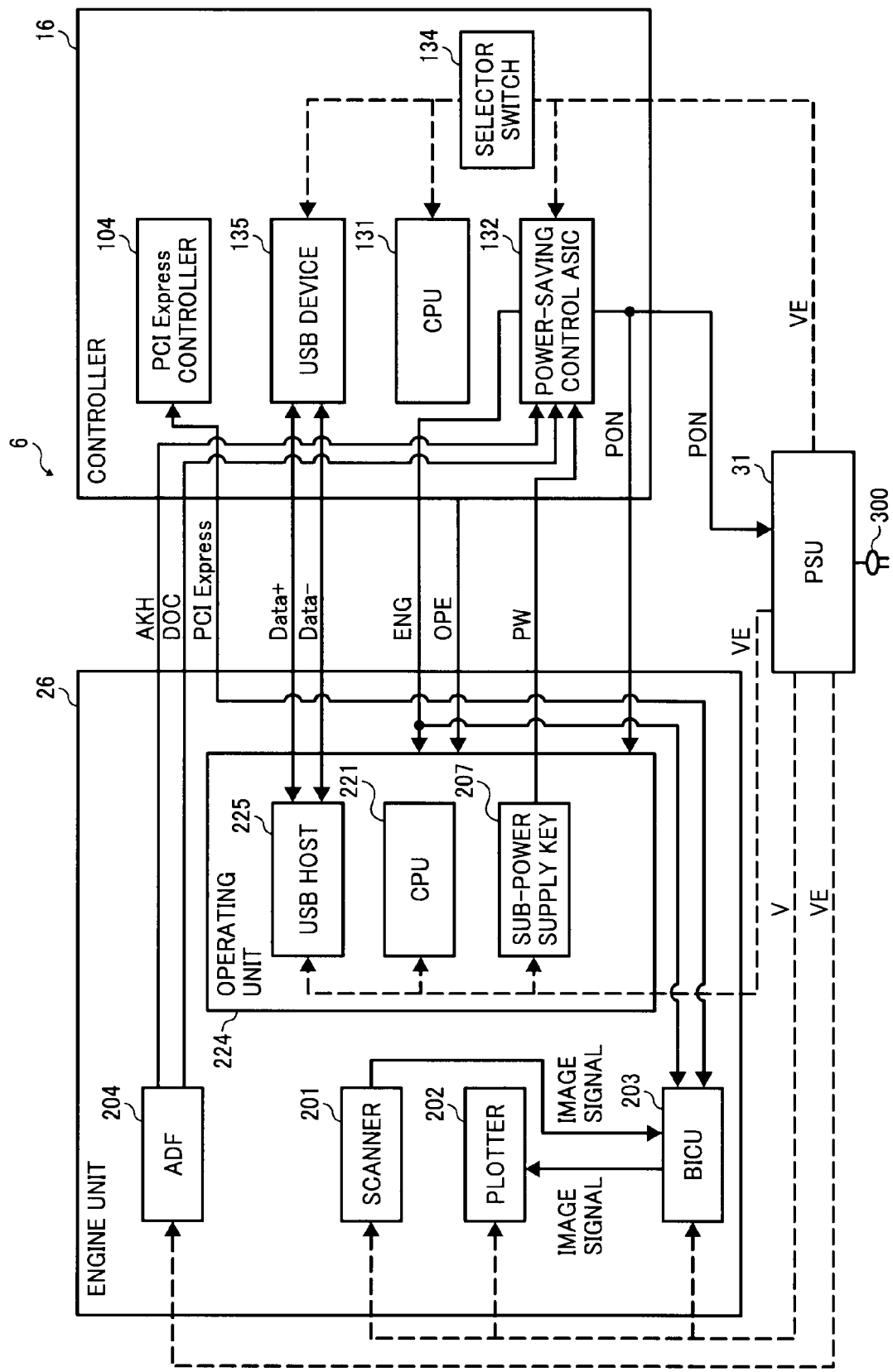
FIG. 6 is a block diagram of an image forming apparatus according to a sixth embodiment of the present invention.

FIG. 6 is a block diagram of an image forming apparatus 6 according to a sixth embodiment of the present invention. The portions identical to those in FIG. 5 are denoted with the same reference numerals, and the description of those portions is omitted. A difference between the image forming apparatuses 5 and 6 is that, in the image forming apparatus 6, a controller 16 includes a USB device 135 instead of the USB host 133, and the operating unit 224 in an engine unit 26 includes the USB host 225 instead of the USB device 222.

Figure 7:
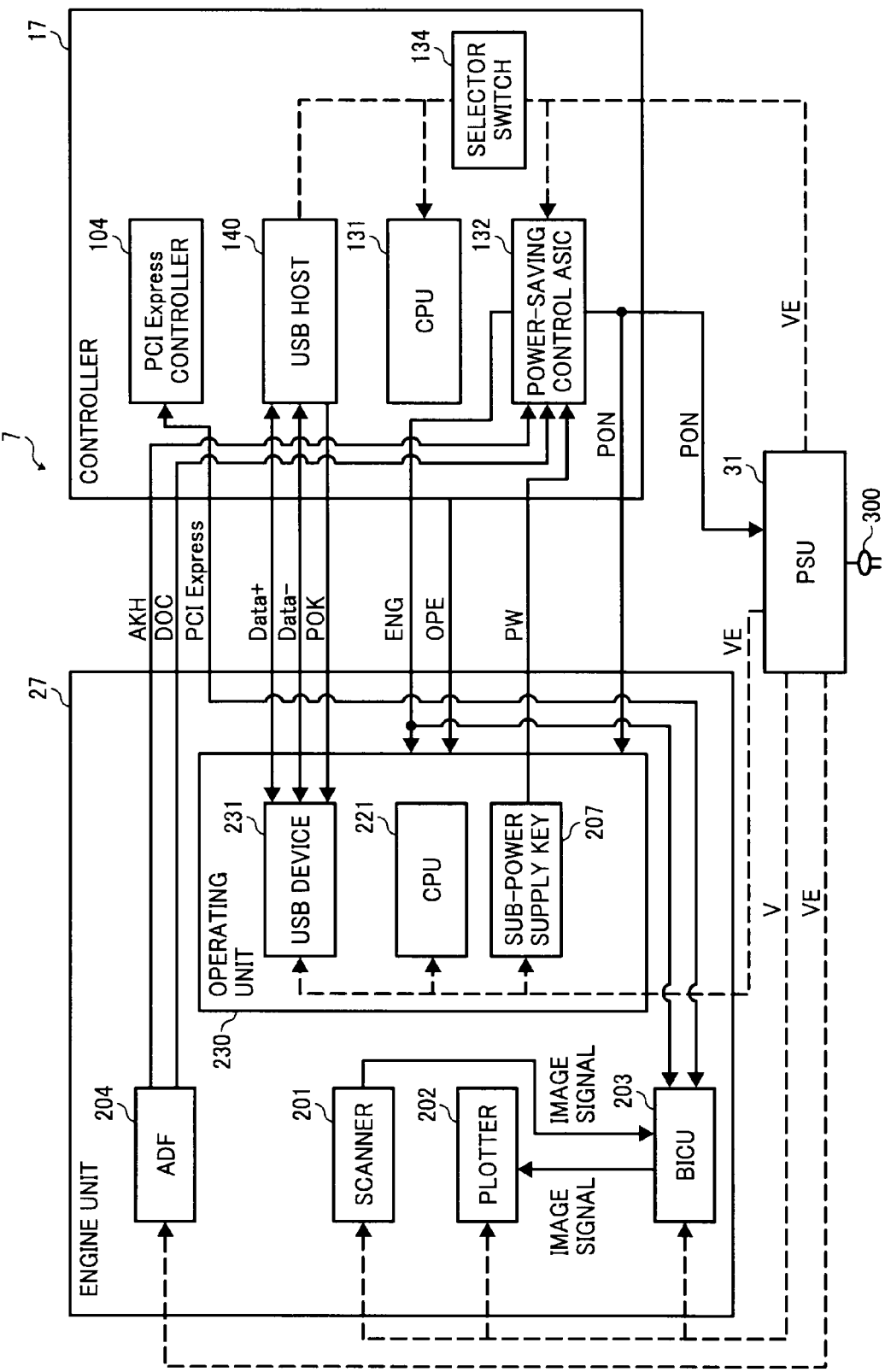
FIG. 7 is a block diagram of an image forming apparatus according to a seventh embodiment of the present invention.

FIG. 7 is a block diagram of an image forming apparatus 7 according to a seventh embodiment of the present invention. The portions identical to those in FIG. 5 are denoted with the same reference numerals, and the description of those portions is omitted. A difference between the image forming apparatuses 5 and 7 is that, in the image forming apparatus 7, a controller 17 includes a USB host 140 instead of the USB host 133, and an operating unit 230 in an engine unit 27 includes a USB device 231 instead of the USB device 222. When the electric power is supplied to the USB host 140, the USB host 140 transmits a POK signal to the USB device 231. The POK signal is a detection signal indicating that it is detected that a power supply voltage is within a predetermined voltage range. Upon receiving the POK signal, the USB device 231 sends back a connection notification indicating a connection with the USB host 140 to the USB host 140 as a connection destination, and starts detecting the USB host 140. Specifically, the connection notification indicates that the USB host 140 is notified of the connection with the USB device 231 in such a manner that either the Data+ line or the Data− line that is connected to a pull-up resistor (not shown) is pulled up by the application of an electronic power of +5 volts from the pull-up resistor (pulled up to a high level by the pull-up resistor).

If the Data+ line is pulled up when the USB host 140 is not turned ON, a chip (not shown) of the USB host 140 could be damaged. A start-up time of the USB host 140 varies depending on an environment condition. A signal on the Data+ line from the USB device 231 can be pulled up after a lapse of a start-up time under the worst condition. However, with this method, it takes a long time to start up the USB host 140. Consequently, the change from the power-saving mode to the normal mode is delayed.

To solve the problem, in the image forming apparatus 7, the USB host 140 is configured to transmit the POK signal to the USB device 231. Therefore, upon receiving the POK signal, the USB device 231 can recognize that the USB host 140 is turned ON regardless of the varying start-up time of the USB host 140. Therefore, the USB device 231 can detect the USB host 140 as the connection destination in the shortest time, and thus it is possible to change the operation mode from the power-saving mode to the normal mode quickly.

Figure 8:
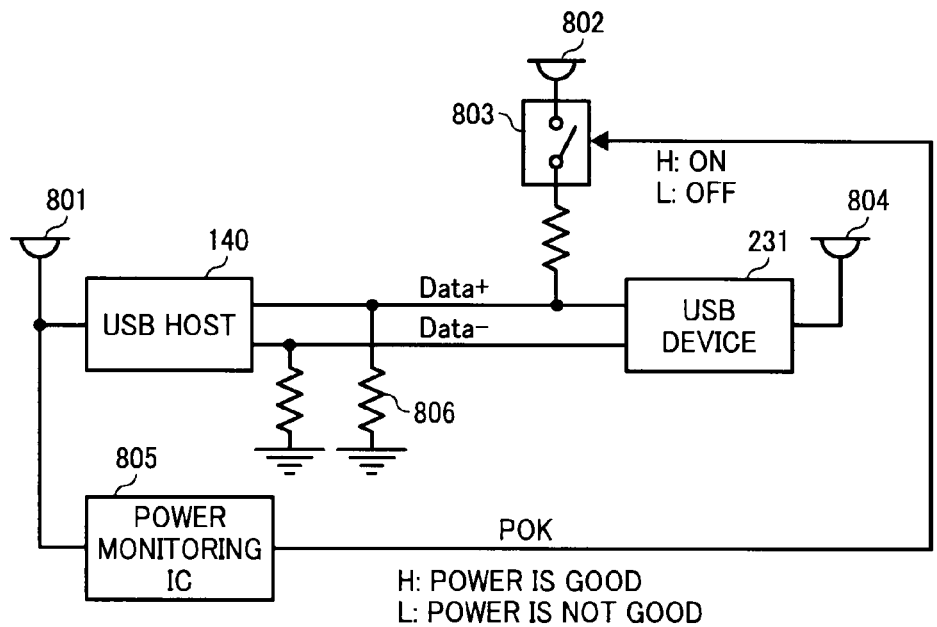
FIG. 8 is a circuit diagram of the image forming apparatus shown in FIG. 7 for explaining a connection detecting mechanism.
Figure 9:
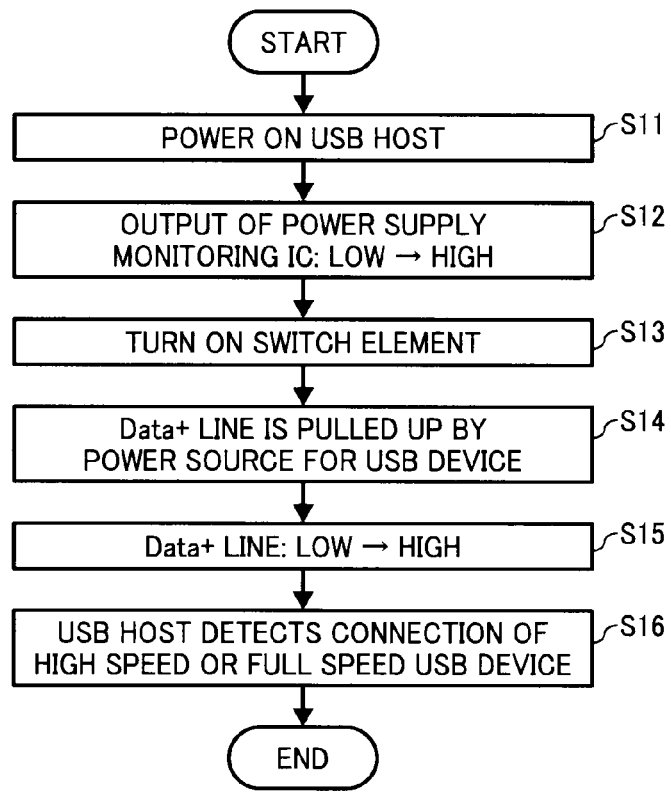
FIG. 9 is a flowchart of a connection detecting process performed by the image forming apparatus shown in FIG. 7.

FIG. 8 is a circuit diagram for explaining a connection detecting mechanism of the image forming apparatus 7. FIG. 9 is a flowchart of a connection detecting process performed by the image forming apparatus 7.

When a power source 801 for the USB host 140 is turned ON (step S11), a power monitoring IC 805 detects that the power source 801 is turned ON, and changes an output from the power monitoring IC 805 from low to high (step S12). Consequently, the POK signal is transmitted from the USB host 140 to the USB device 231. A power source 802 is connected to a terminal of a switch element 803. The switch element 803 including a field-effect transistor (FET) and the like is turned ON (step S13), so that the Data+ line of the USB is pulled up by a power source 804 for the USB device 231 through a pull-up resistor 806 (step S14). As a result, a signal level of the Data+ line is changed from low to high (step S15). Consequently, the USB host 140 is notified of a connection with the USB device 231 from the USB device 231. After that, the USB host 140 detects that the high-speed or full-speed USB device 231 is connected to the USB host 140 (step S16).

In this manner, when the operating mode of the image forming apparatus 7 is changed from the power-saving mode to the normal mode, it is possible to activate the USB device 231 and the USB host 140 quickly with preventing the Data+ line or the Data− line from being energized before the USB host 140 is turned ON.

Figure 10:
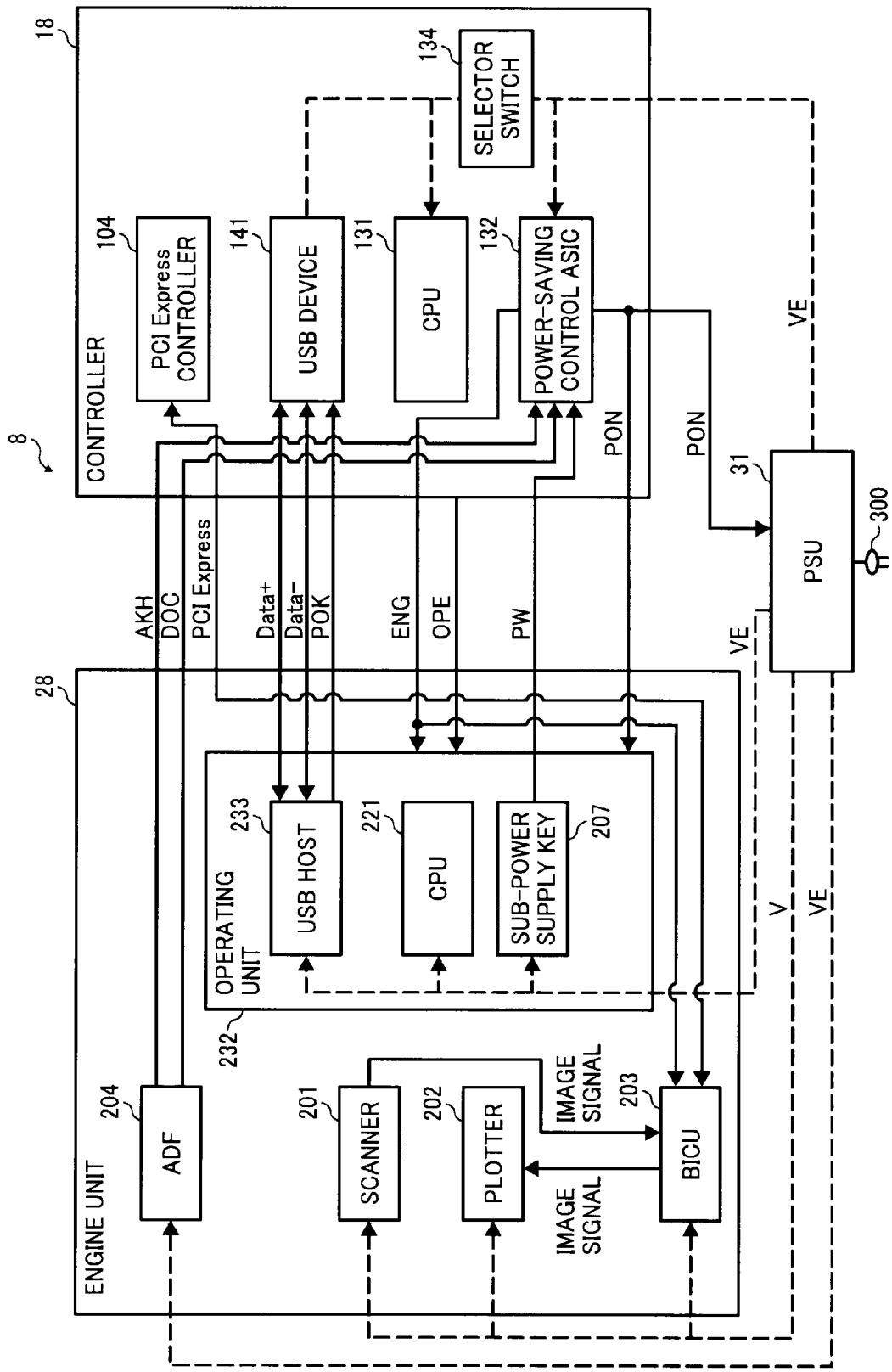
FIG. 10 is a block diagram of an image forming apparatus according to an eighth embodiment of the present invention.

FIG. 10 is a block diagram of an image forming apparatus 8 according to an eighth embodiment of the present invention. The portions identical to those in FIG. 7 are denoted with the same reference numerals, and the description of those portions is omitted. A difference between the image forming apparatuses 7 and 8 is that, in the image forming apparatus 8, a controller 18 includes a USB device 141 instead of the USB host 140, and an operating unit 232 in an engine unit 28 includes a USB host 233 instead of the USB device 231. In the image forming apparatus 8, the USB host 233 transmits the POK signal to the USB device 141.

Figure 11:
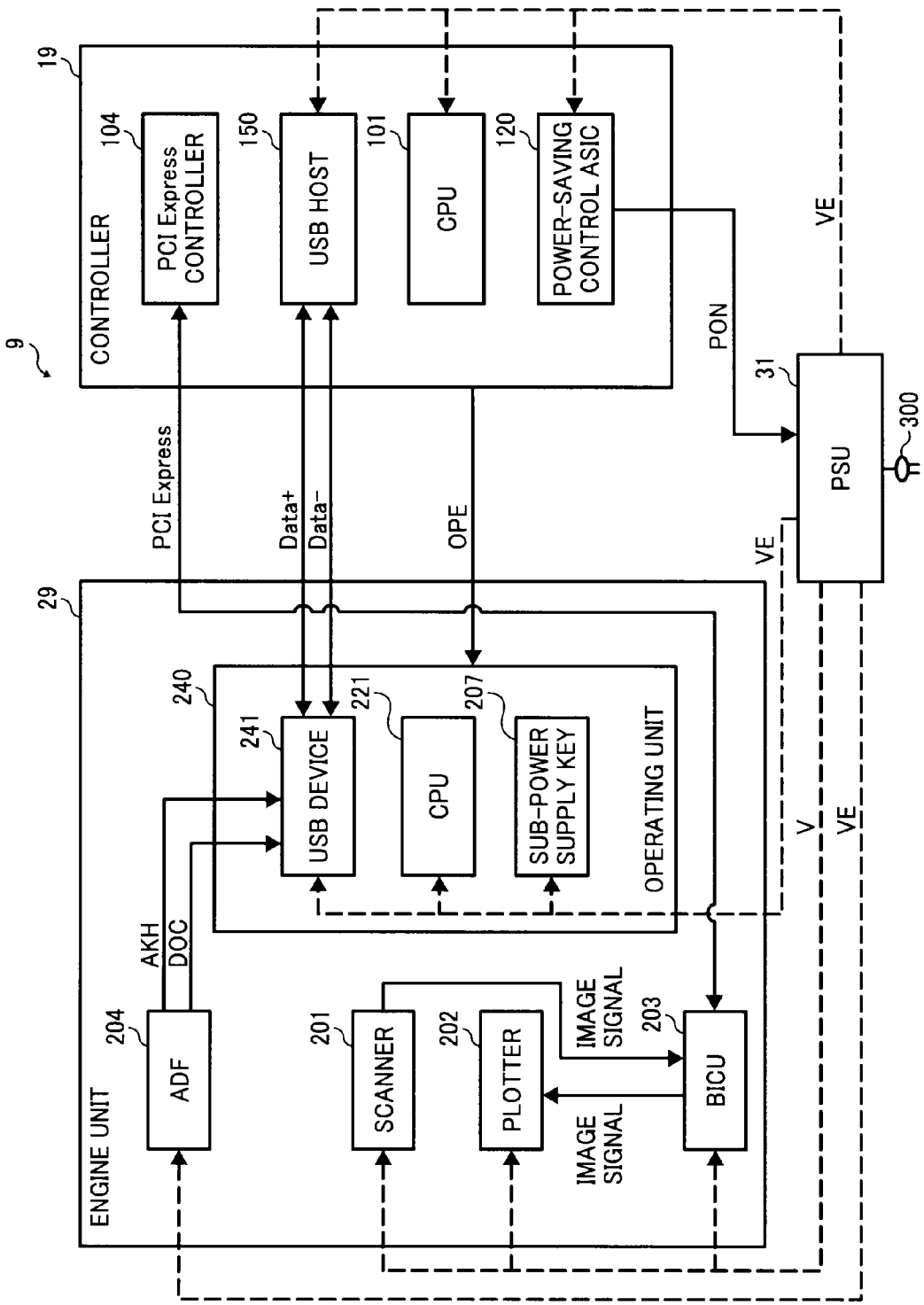
FIG. 11 is a block diagram of an image forming apparatus according to a ninth embodiment of the present invention.

FIG. 11 is a block diagram of an image forming apparatus 9 according to a ninth embodiment of the present invention. The portions identical to those in FIG. 3 are denoted with the same reference numerals, and the description of those portions is omitted. A difference between the image forming apparatuses 3 and 9 is that, in the image forming apparatus 9, a controller 19 includes a USB host 150 instead of the USB host 103, and an operating unit 240 in an engine unit 29 includes a USB device 241 instead of the USB device 222.

The ADF 204 transmits the AKH signal and the DOC signal to the USB device 241 in the operating unit 240. The USB device 241 replaces the ENG signal in addition to the AKH signal and the DOC signal with a USB command, and transmits the USB command to the USB host 150. The USB host 150 replaces the PON signal and the ENG signal with a USB command, and transmits the USB command to the USB device 241.

In this manner, in the image forming apparatus 9, data transferred via the signal line is replaced with a USB command, and the USB command is transmitted/received via the USB. Therefore, it is possible to reduce the costs as compared with a case of reducing the number of pins.

Figure 12:
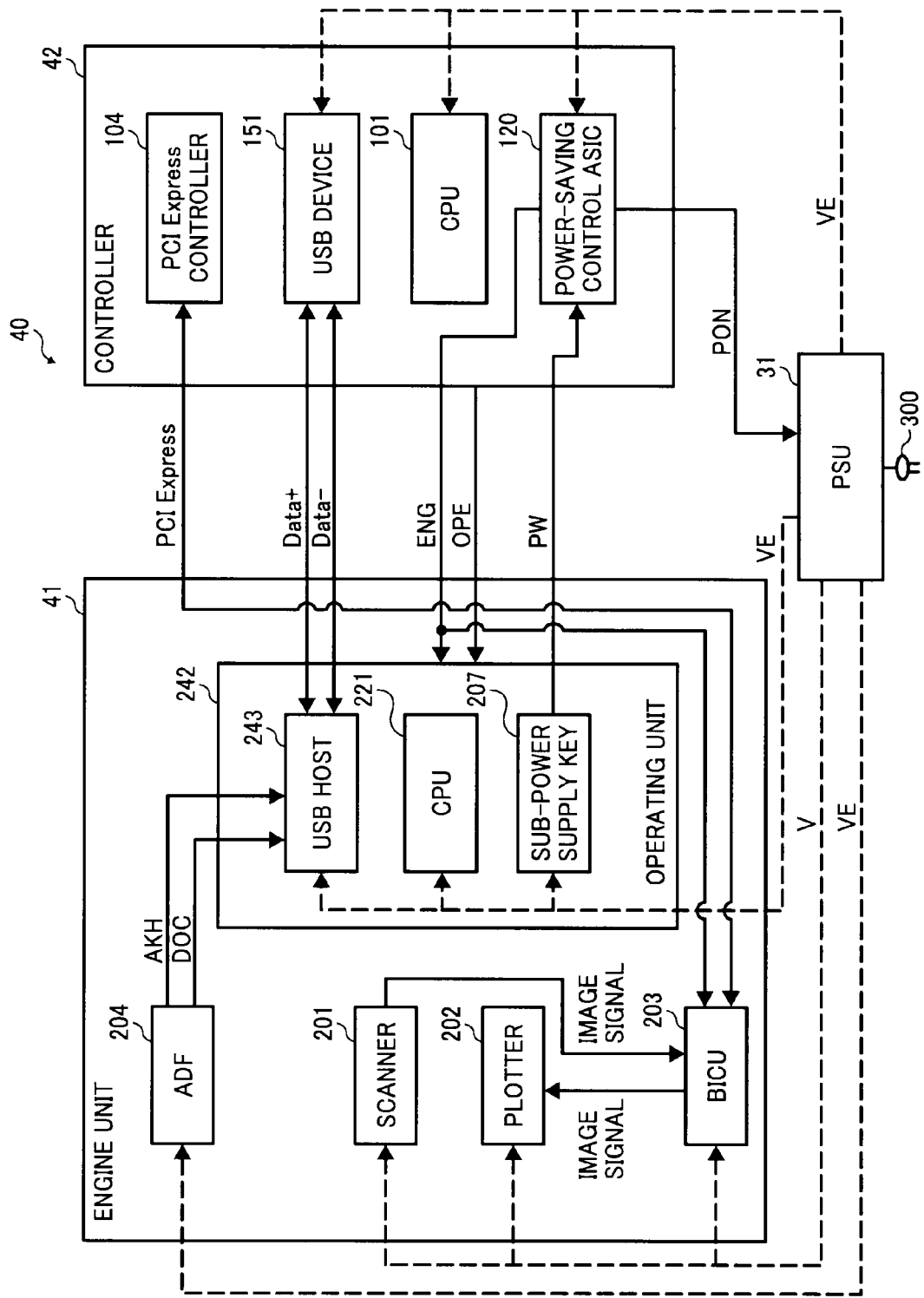
FIG. 12 is a block diagram of an image forming apparatus according to a tenth embodiment of the present invention.

FIG. 12 is a block diagram of an image forming apparatus 40 according to a tenth embodiment of the present invention. The portions identical to those in FIG. 11 are denoted with the same reference numerals, and the description of those portions is omitted. A difference between the image forming apparatuses 9 and 40 is that, in the image forming apparatus 40, a controller 42 includes a USB device 151 instead of the USB host 150, and an operating unit 242 in an engine unit 41 includes a USB host 243 instead of the USB device 241.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an operating unit that receives an operation input from a user;
    a controller that includes a first control unit for controlling the image forming apparatus;
    a transmission line that connects the operating unit to the controller as a channel for a data transfer between the operating unit and the controller with a differential data transfer method; and
    a power supplying unit that supplies an electric power to the image forming apparatus, wherein
    the operating unit includes a first data-transfer unit that transmits data to the controller and receives data from the controller via the transmission line,
    the controller includes a second data-transfer unit that transmits data to the operating unit and receives data from the operating unit via the transmission line,
    the controller further includes a second control unit for controlling an operation mode of the image forming apparatus, the operation mode including a normal mode in which the electric power is supplied to all units of the image forming apparatus and a power-saving mode in which the electric power is supplied to a part of units of the image forming apparatus, and
    regardless of the operation mode, the power supplying unit continuously supplies the electric power to the first data-transfer unit and the second data-transfer unit.

2. The image forming apparatus according to claim 1, wherein when the second control unit receives an instruction to change the operation mode from the power-saving mode to the normal mode, the first data-transfer unit transmits a notification signal indicative of a change of the operation mode to the normal mode as a command to the second data-transfer unit via the transmission line.

3. The image forming apparatus according to claim 1, wherein a universal serial bus is used as the transmission line.

4. The image forming apparatus according to claim 3, wherein
    the first data-transfer unit is a universal serial bus host device, and
    the second data-transfer unit is a universal serial bus device.

5. The image forming apparatus according to claim 4, wherein
    when an electric-power supply to the universal serial bus host device is started, the universal serial bus host device transmits a detection signal indicating that a power supply voltage is within a predetermined voltage range to the universal serial bus device, and
    when the universal serial bus device receives the detection signal, the universal serial bus host device detects that the universal serial bus device is connected to the universal serial bus host device.

6. The image forming apparatus according to claim 5, wherein after the universal serial bus device receives the detection signal, the universal serial bus device transmits a connection notification indicating that the universal serial bus device is connected to the universal serial bus host device to the universal serial bus host device.

7. The image forming apparatus according to claim 3, wherein
    the first data-transfer unit is a universal serial bus device, and
    the second data-transfer unit is a universal serial bus host device.

8. The image forming apparatus according to claim 7, wherein
    when an electric-power supply to the universal serial bus host device is started, the universal serial bus host device transmits a detection signal indicating that a power supply voltage is within a predetermined voltage range to the universal serial bus device, and
    when the universal serial bus device receives the detection signal, the universal serial bus host device detects that the universal serial bus device is connected to the universal serial bus host device.

9. The image forming apparatus according to claim 8, wherein after the universal serial bus device receives the detection signal, the universal serial bus device transmits a connection notification indicating that the universal serial bus device is connected to the universal serial bus host device to the universal serial bus host device.

10. An image forming apparatus, comprising:
    a power supplying unit that supplies an electric power to the image forming apparatus,
    an operating unit that receives an operation input from a user;
    a controller that includes a first control unit for controlling the image forming apparatus; and
    a transmission line that connects the operating unit to the controller as a channel for a data transfer between the operating unit and the controller with a differential data transfer method, wherein
    the operating unit includes a first data-transfer unit that transmits data to the controller and receives data from the controller via the transmission line,
    the controller includes a second data-transfer unit that transmits data to the operating unit and receives data from the operating unit via the transmission line,
    a universal serial bus is used as the transmission line,
    the first data-transfer unit is a universal serial bus host device,
    the second data-transfer unit is a universal serial bus device,
    the controller further includes a second control unit for controlling an operation mode of the image forming apparatus, the operation mode including a normal mode in which the electric power is supplied to all units of the image forming apparatus and a power-saving mode in which the electric power is supplied to a part of the units of the image forming apparatus,
    when the second control unit sets the operation mode to the power-saving mode, the power supplying unit supplies the electric power to one of the first data-transfer unit and the second data-transfer unit, and
    when the second control unit receives an instruction to change the operation mode from the power-saving mode to the normal mode, the first data-transfer unit transmits a notification signal indicative of a change of the operation mode to the normal mode as a command to the second data-transfer unit via the transmission line.

11. An image forming apparatus, comprising:
an operating unit that receives an operation input from a user;
a controller that includes a first control unit for controlling the image forming apparatus; and
a transmission line that connects the operating unit to the controller as a channel for a data transfer between the operating unit and the controller with a differential data transfer method, wherein
the operating unit includes a first data-transfer unit that transmits data to the controller and receives data from the controller via the transmission line,
the controller includes a second data-transfer unit that transmits data to the operating unit and receives data from the operating unit via the transmission line, wherein
a universal serial bus is used as the transmission line,
the first data-transfer unit is a universal serial bus host device,
the second data-transfer unit is a universal serial bus device,
when an electric-power supply to the universal serial bus host device is started, the universal serial bus host device transmits a detection signal indicating that a power supply voltage is within a predetermined voltage range to the universal serial bus device, and
when the universal serial bus device receives the detection signal, the universal serial bus host device detects that the universal serial bus device is connected to the universal serial bus host device.

12. The image forming apparatus according to claim 11, wherein after the universal serial bus device receives the detection signal, the universal serial bus device transmits a connection notification indicating that the universal serial bus device is connected to the universal serial bus host device to the universal serial bus host device.

13. A connection notifying method performed by an image forming apparatus that includes an operating unit that receives an operation input from a user, a controller that includes a first control unit for controlling the image forming apparatus, a transmission line that connects the operating unit to the controller as a channel for a data transfer between the operating unit and the controller with a differential data transfer method, a first data-transfer unit included in the operating unit and configured to transmit data to the controller and receive data from the controller via the transmission line, and a second data-transfer unit included in the controller and configured to transmit data to the operating unit and receive data from the operating unit via the transmission line, the method comprising:
    transmitting a signal indicating that a power supply voltage is within a predetermined voltage range from the second data-transfer unit to the first data-transfer unit when the second data-transfer unit is turned ON; and
    transmitting a connection notification from the first data-transfer unit to the second data-transfer unit when the first data-transfer unit receives the signal.

* * * * *